United States Patent
Kemp et al.

(10) Patent No.: US 12,526,626 B2
(45) Date of Patent: Jan. 13, 2026

(54) ENDPOINT INFORMATION HANDLING SYSTEM (IHS) CONFIGURATION BASED ON NETWORK CONTEXT

(71) Applicant: Dell Products, L.P., Round Rock, TX (US)

(72) Inventors: Walter Kemp, Georgetown, TX (US); Kearson M. McNulty, Austin, TX (US); Harpreet Narula, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 169 days.

(21) Appl. No.: 18/337,755

(22) Filed: Jun. 20, 2023

(65) Prior Publication Data

US 2024/0430672 A1    Dec. 26, 2024

(51) Int. Cl.
*H04W 12/06* (2021.01)
*H04W 12/043* (2021.01)
*H04W 48/16* (2009.01)

(52) U.S. Cl.
CPC ......... *H04W 12/06* (2013.01); *H04W 12/043* (2021.01); *H04W 48/16* (2013.01)

(58) Field of Classification Search
CPC .... H04W 12/06; H04W 12/043; H04W 48/16
See application file for complete search history.

(56) References Cited

U.S. PATENT DOCUMENTS

| | | | |
|---|---|---|---|
| 10,797,948 B2 | 10/2020 | Kemp et al. | |
| 2012/0290687 A1* | 11/2012 | Callaway | H04L 67/00 709/219 |
| 2014/0108660 A1* | 4/2014 | Muthiah | G06F 9/5061 709/226 |
| 2019/0228178 A1* | 7/2019 | Sharma | H04L 63/0853 |
| 2021/0099864 A1* | 4/2021 | Winoto | H04L 9/065 |
| 2022/0377084 A1* | 11/2022 | Zhang | H04L 9/0841 |

\* cited by examiner

*Primary Examiner* — Kristie D Shingles
(74) *Attorney, Agent, or Firm* — Fogarty LLP

(57) ABSTRACT

For endpoint Information Handling System (IHS) configuration based on network context, the IHS may use a discovery network service to find a location of an encrypted (and signed using public key infrastructure) options document, decrypted and validate the options document using the public encryption key, and use (a) option(s) from the resultingly decrypted options document to modify behavior of the IHS. The IHS may use the discovery network service to determine the IHS's environment, prior to using the discovery network service to find the location of the options document. The IHS may remove the public encryption key, in repose to completion of modification of the IHS's behavior in accordance with the option(s) from the decrypted options document.

18 Claims, 4 Drawing Sheets

ENDPOINT INFORMATION HANDLING SYSTEM (IHS) CONFIGURATION BASED ON NETWORK CONTEXT

FIELD

This disclosure relates generally to Information Handling Systems (IHSs), and, more specifically, to endpoint IHS configuration based on network context.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An "endpoint" is a device (i.e., IHS) to be managed connected to the network. Typically, endpoints do not have context awareness that will allow for different behaviors and/or configurations based upon location, without reliance on user context or attempting to discover if they have access to various resources. Most typical solutions are centered around changing the context based on the user or the resource that a user is trying to access.

The Dynamic Host Configuration Protocol (DHCP) options methodology is a networking standard. A listing of available options including some that are not currently reserved is provided at https://www.iana.org/assignments/bootp-dhcp-parameters/bootp-dhcp-parameters.xhtml. However, DHCP is not secure. Additionally, each option is limited in the amount of data it can hold.

SUMMARY

Embodiments of endpoint Information Handling System (IHS) configuration based on network context are described. In an illustrative, non-limiting example an IHS may use a discovery network service to find a location of an encrypted (and signed using public key infrastructure) options document, decrypted and validate the options document using the public encryption key, and use (a) option(s) from the resultingly decrypted options document to modify behavior of the IHS. In some examples, the IHS may remove the public encryption key, in repose to completion of modification of the IHS's behavior in accordance with the option(s) from the decrypted options document.

Further, the IHS may use the discovery network service to determine the IHS's environment, prior to using the discovery network service to find the location of the options document. In an example, the IHS may use the discovery network service to determine the IHS's environment by: determining a wireless network accessed by the IHS is open by determining the network does not have security; determining the IHS's environment is a factory and/or enterprise environment by determining the network is managed by a domain controller, using a network management protocol to determine network configuration details, determining the network has WI-FI Protected Access 2-Enterprise (WPA2-Enterprise) security, determining the network has a commercial Organizationally Unique Identifier (OUI), using a Basic Service Set Identifier (BSSID) of an access point of the network and/or a Controller Media Access Control (MAC) address range to detect a specific location, or determining the network AP or controller has a Group Policy Object (GPO) filter to authenticate client devices as part of a working environment; determining the IHS's environment is public by determining an information element in a header of one or more network packets define an Access Network Options (ANO) Access Network Type (ANT) as public, or determining the network is not listed in a Network List Manager (NLM) as private; and determining the IHS's environment is private by determining the information element in the header of the one or more network packets defines the ANO ANT as private, or determining the network is listed in the NLM as private.

In various examples, the location of the options document may be a secure protocol Uniform Resource Locator (URL), and the IHS may retrieve the encrypted options document at the secure protocol URL via a transport layer security connection to the secure protocol URL. In various (other) examples the location of the options document may be a secure protocol server IHS, and the IHS may retrieve the encrypted options document from the secure protocol server IHS via a transport layer security connection to the secure protocol server IHS.

In some examples, the public encryption key and the options document may be associated with a facility, in such examples, the option(s) from the decrypted options document may modify behavior of the IHS, such as to optimize one or more tasks to be performed within the facility, in further examples. In still further or other examples the IHS's behavior may only be modified for as long as the IHS can locate the options document.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

This disclosure relates generally to Information Handling Systems (IHSs), and, more specifically, to endpoint IHS configuration based on network context. For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. An IHS may act as an endpoint device (i.e., a device to be managed connected to a network). The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components. A more detailed example of an IHS is described with respect to FIG. 1.

Figure 1:
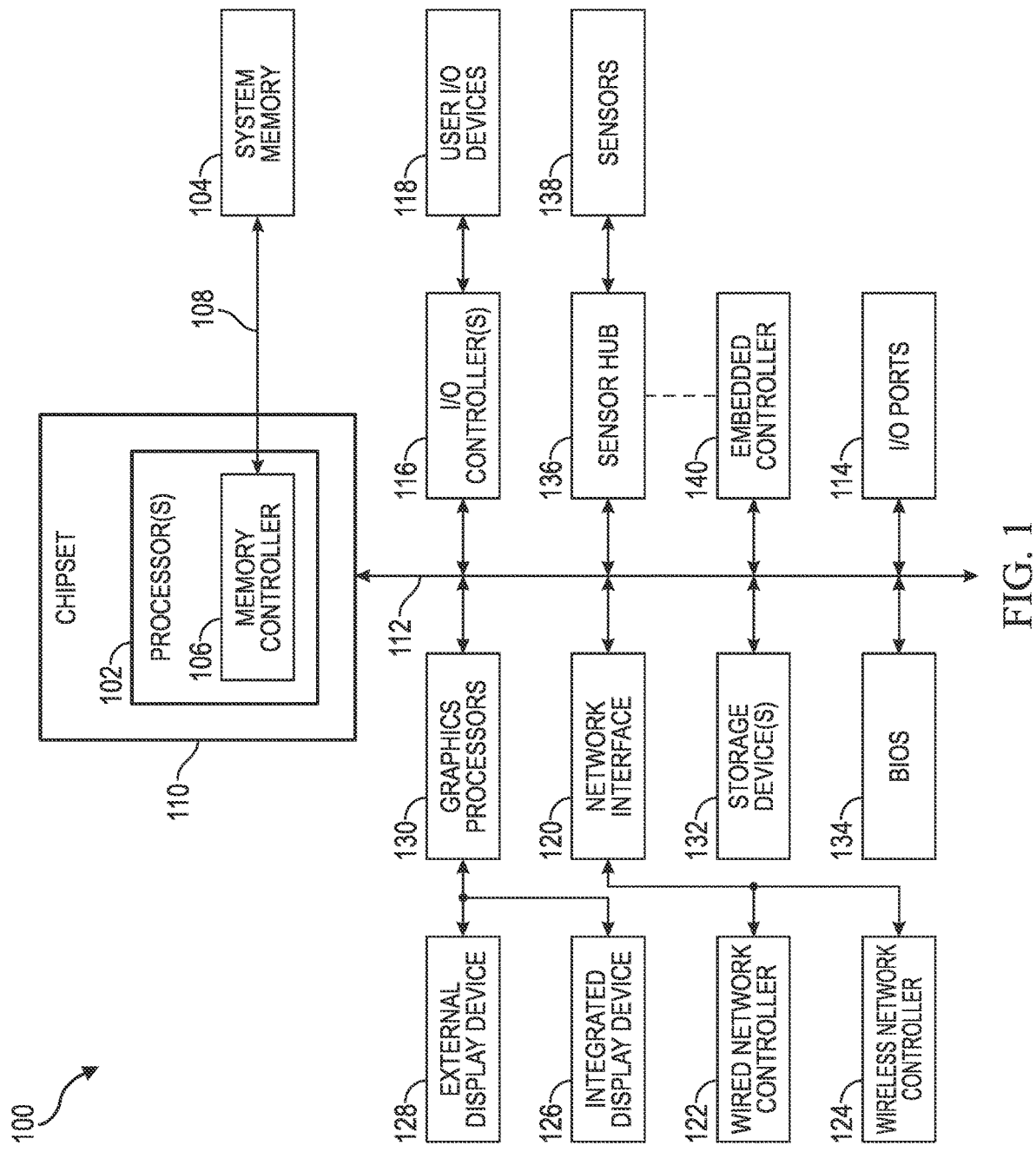
FIG. 1 is a block diagram illustrating components of an example of an Information Handling System (IHS), according to some embodiments.

FIG. 1 is a block diagram of an example of internal components of IHS 100, according to some embodiments. As shown, IHS 100 includes one or more processors 102, such as a Central Processing Unit (CPU), that execute code retrieved from system memory 104. Although IHS 100 is illustrated with a single processor 102, other embodiments may include two or more processors, that may each be configured identically, or to provide specialized processing operations. Processor(s) 102 may include any processor capable of executing instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor(s) 102 includes memory controller 106 that may be implemented directly within the circuitry of processor(s) 102, or memory controller 106 may be a separate integrated circuit that is located on the same die as processor(s) 102. Memory controller 106 may be configured to manage the transfer of data to and from the system memory 104 of IHS 100 via high-speed memory interface 108. System memory 104 coupled to processor(s) 102 provides processor(s) 102 with a high-speed memory that may be used in the execution of computer program instructions by processor(s) 102. Accordingly, system memory 104 may include memory components, such as static RAM (SRAM), dynamic RAM (DRAM), NAND Flash memory, suitable for supporting high-speed memory operations by processor(s) 102. In certain embodiments, system memory 104 may combine both persistent, non-volatile memory and volatile memory. In certain embodiments, system memory 104 may include multiple removable memory modules.

IHS 100 utilizes chipset 110 that may include one or more integrated circuits that are connected to processor(s) 102. In the embodiment of FIG. 1, processor(s) 102 is depicted as a component of chipset 110. In other embodiments, all of chipset 110, or portions of chipset 110 may be implemented directly within the integrated circuitry of processor(s) 102. Chipset 110 provides processor(s) 102 with access to a variety of resources accessible via bus 112. In IHS 100, bus 112 is illustrated as a single element. Various embodiments may utilize any number of separate buses to provide the illustrated pathways served by bus 112.

In various embodiments, IHS 100 may include one or more I/O ports 114 that may support removeable couplings with various types of external devices and systems, including removeable couplings with peripheral devices that may be configured for operation by a particular user of IHS 100. For instance, I/O ports 114 may include USB (Universal Serial Bus) ports, by which a variety of external devices may be coupled to IHS 100. In addition to or instead of USB ports, I/O ports 114 may include various types of physical I/O ports that are accessible to a user via the enclosure of IHS 100.

In certain embodiments, chipset 110 may additionally utilize one or more I/O controllers 116 that may each support the operation of hardware components such as user I/O devices 118 that may include peripheral components physically coupled to I/O port 114 and/or peripheral components that are wirelessly coupled to IHS 100 via network interface 120. In various implementations, I/O controller 116 may support the operation of one or more user I/O devices 118 such as a keyboard, mouse, touchpad, touchscreen, microphone, speakers, camera and other input and output devices that may be coupled to IHS 100. User I/O devices 118 may interface with an I/O controller 116 through wired or wireless couplings supported by IHS 100. In some cases, I/O controllers 116 may support configurable operation of supported peripheral devices, such as user I/O devices 118.

As illustrated, a variety of additional resources may be coupled to processor(s) 102 of IHS 100 through chipset 110. For instance, chipset 110 may be coupled to network interface 120 that may support different types of network connectivity. IHS 100 may also include one or more Network Interface Controllers (NICs) 122 and 124, each of which may implement the hardware required for communicating via a specific networking technology, such as BLUETOOTH, in accordance with various embodiments of the present systems and methods, wireless local area network (e.g., Wi-Fi®), Ethernet and mobile cellular networks (e.g., CDMA, TDMA, LTE). Network interface 120 may support network connections by wired network controllers 122 and wireless network controllers 124. Each network controller 122 and 124 may be coupled via various buses to chipset 110 to support different types of network connectivity, such as the network connectivity utilized by IHS 100.

As illustrated, IHS 100 may support integrated display device 126, such as a display integrated into a terminal, laptop, tablet, 2-in-1 convertible device, or mobile device. IHS 100 may also support use of one or more external displays 128, such as external monitors that may be coupled to IHS 100 via various types of couplings, such as by connecting a cable from the external display 128 to external I/O port 128 of the IHS 100. One or more display devices 126 and/or 128 coupled to IHS 100 may utilize LCD, LED, OLED, or other display technologies. Each display device 126 and 128 may be capable of receiving touch inputs such as via a touch controller that may be an embedded component of display device 126 and/or 128 or graphics processor 130, or it may be a separate component of IHS 100 accessed via bus 112. In some cases, power to graphics processor 130, integrated display device 126 and/or external display 128 may be turned off or configured to operate at minimal power levels in response to IHS 100 entering a low-power state (e.g., standby). Chipset 110 may provide access to one or more display device(s) 126 and/or 128 via graphics processor 130. Graphics processor 130 may be included within a video card, graphics card or within an embedded controller installed within IHS 100. Additionally, or alternatively, graphics processor 130 may be integrated within processor (s) 102, such as a component of a system-on-chip (SoC). Graphics processor 130 may generate display information and provide the generated information to one or more display device(s) 126 and/or 128, coupled to IHS 100.

Chipset 110 also provides processor(s) 102 with access to one or more storage devices 132. In various embodiments, storage device 132 may be integral to IHS 100 or may be external to IHS 100. In certain embodiments, storage device 132 may be accessed via a storage controller that may be an integrated component of the storage device. Storage device 132 may be implemented using any memory technology allowing IHS 100 to store and retrieve data. For instance, storage device 132 may be a magnetic hard disk storage drive or a solid-state storage drive. In certain embodiments, storage device 132 may be a system of storage devices, such as a cloud system or enterprise data management system that is accessible via network interface 120.

As illustrated, IHS 100 also includes Basic Input/Output System (BIOS) 134 that may be stored in a non-volatile memory accessible by chipset 110 via bus 112. Upon powering or restarting IHS 100, processor(s) 102 may utilize BIOS 134 instructions to initialize and test hardware components coupled to the IHS 100. BIOS 134 instructions may also load an OS (e.g., WINDOWS, MACOS, iOS, ANDROID, LINUX, etc.) for use by IHS 100. BIOS 134 provides an abstraction layer that allows the operating system to interface with the hardware components of the IHS 100. The Unified Extensible Firmware Interface (UEFI) was designed as a successor to BIOS. As a result, many IHSs utilize UEFI in addition to or instead of a BIOS. As used herein, BIOS is intended to also encompass UEFI. IHS firmware (UEFI or BIOS), or the like, may enable a user to configure a "boot order." The IHS will try to boot from a first indicated device, and if this fails, the IHS will attempt to boot from the next indicated device, etc.

As illustrated, certain IHS 100 embodiments may utilize sensor hub 136 capable of sampling and/or collecting data from a variety of hardware sensors 138. Sensors may provide access to data describing environmental and operating conditions of IHS 100 (e.g., accelerometers, gyroscopes, hinge sensors, rotation sensors, hall effect sensors, temperature sensors, voltage sensors, current sensors, IR sensors, photosensors, proximity sensors, distance sensors, magnetic sensors, microphones, ultrasonic sensors, etc.). Generally, in various implementations, processor 102 may receive and/or produce context information using sensors 138 including one or more of, for example: a user's presence state (e.g., present, near-field, mid-field, far-field, absent), a facial expression of the user, a direction of the user's gaze, a user's gesture, a user's voice, an IHS location (e.g., based on the location of a wireless Access Point (AP) or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., holding a stylus, or the like), a time of day, software application(s) under execution in focus for receiving keyboard input, whether IHS 100 is inside or outside of a carrying bag, ambient lighting, a battery charge level, whether IHS 100 is operating from battery power or is plugged into an AC power source (e.g., whether the IHS is operating in AC-only mode, DC-only mode, or AC+DC mode), a power consumption of various components of IHS 100 (e.g., CPU 102, GPU 130, system memory 104, etc.), an operating temperature of components of IHS 100, such as CPU temperature, memory module temperature, etc. In certain embodiments, sensor hub 136 may be an independent microcontroller or other logic unit that is coupled to the motherboard of IHS 100. Sensor hub 136 may be a component of an integrated system-on-chip incorporated into processor 102, and it may communicate with chipset 110 via a bus connection such as an Inter-Integrated Circuit (I2C) bus or other suitable type of bus connection. Sensor hub 136 may also utilize an I2C bus for communicating with various sensors supported by IHS 100.

As illustrated, IHS 100 may utilize embedded controller (EC) 140, which may be a motherboard component of IHS 100 and may include one or more logic units. In certain embodiments, EC 140 may operate from a separate power plane from the main processors 102 and thus the OS operations of IHS 100. Firmware instructions utilized by EC 140 may be used to operate a secure execution system that may include operations for providing various core functions of IHS 100, such as power management, management of operating modes in which IHS 100 may be physically configured and support for certain integrated I/O functions. In some embodiments, EC 140 and sensor hub 136 may communicate via an out-of-band signaling pathway or bus 124.

In various embodiments, IHS 100 may not include each of the components shown in FIG. 1. Additionally, or alternatively, IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 102 as an SoC.

A noted above, endpoints do not typically have a context awareness that will allow for different behaviors and/or configurations based upon location, without the endpoint device relying on user context or attempting to discover if it has access to various resources. That is, most typical solutions center around changing the context, based on the user or the resource that user is trying to access.

However, under embodiments of the present endpoint IHS configuration based on network context, an endpoint is location and/or context aware. As a result, endpoint (IHS) behavior can be modified to match an intended use, such as while that device is in a particular facility, in a particular environment, or the like. In accordance with embodiments of the present endpoint IHS configuration based on network context, different endpoint device behaviors (and configurations) are enabled, based on endpoint IHS awareness of its location and/or context.

For example, in one use case, an IHS may, under various embodiments, behave in an optimum manner during manufacturing by eliminating unneeded steps or allowing certain components, processes, or the like, to be configured. However, this same IHS may, in accordance with various (further) embodiments, be restricted in another environment and/or context, such as, in the field, otherwise in an end-user environment, or the like. A scenario that illustrates such an example, and an advantage of such embodiments, may be a process run within an Original Equipment (IHS) Manufacture's (OEM's) facility, or the like, such as a secondary facility, or the like, that may be responsible for device (IHS) configuration, or the like. In such a setting it is typical that an operator performing the configuration must wait until an initial IHS Out-Of-Box Experience (OOBE) screen and then press a certain keyboard key a certain (predefined) number of times, or the like, to begin a (unified) endpoint management service process. If the operator misses this screen and/or interaction, then there is typically no way to restart the process without reimaging the device (i.e., wiping, or clearing, the IHS storage (132) entirely, and reinstalling the IHS Operating System (OS)). Present embodiments enables the IHS to determine that it is in a manufacturing (OEM) facility, eliminating this human interaction can be eliminated, along with the risk of human error.

In another use case, such as a "kiosk" use case, USB ports (114) may be disabled if the IHS is not in a trusted facility, but behavior of the IHS may, in these embodiments, change if the context changes for the endpoint. Under various embodiments such behavior persists, regardless of the resources being accessed, the user account that is the IHS is logged into, or the like. Per such embodiments, the IHS may be primed to turn off the USB ports when the IHS is not attached to a known network, or if a VPN is detected. That is, when manufacturing the device, the USB ports are on. However, when a retail store receives the devices, the retailer can provision the IHS to run kiosks. Then, once the IHS leaves the retail and provisioning facility, the USB ports turn off. Thereafter, servicing back at the OEM or An Original Design Manufacturer (ODM) facility or retail provisioning location, the IHS re-enables the USB ports.

Figure 2:
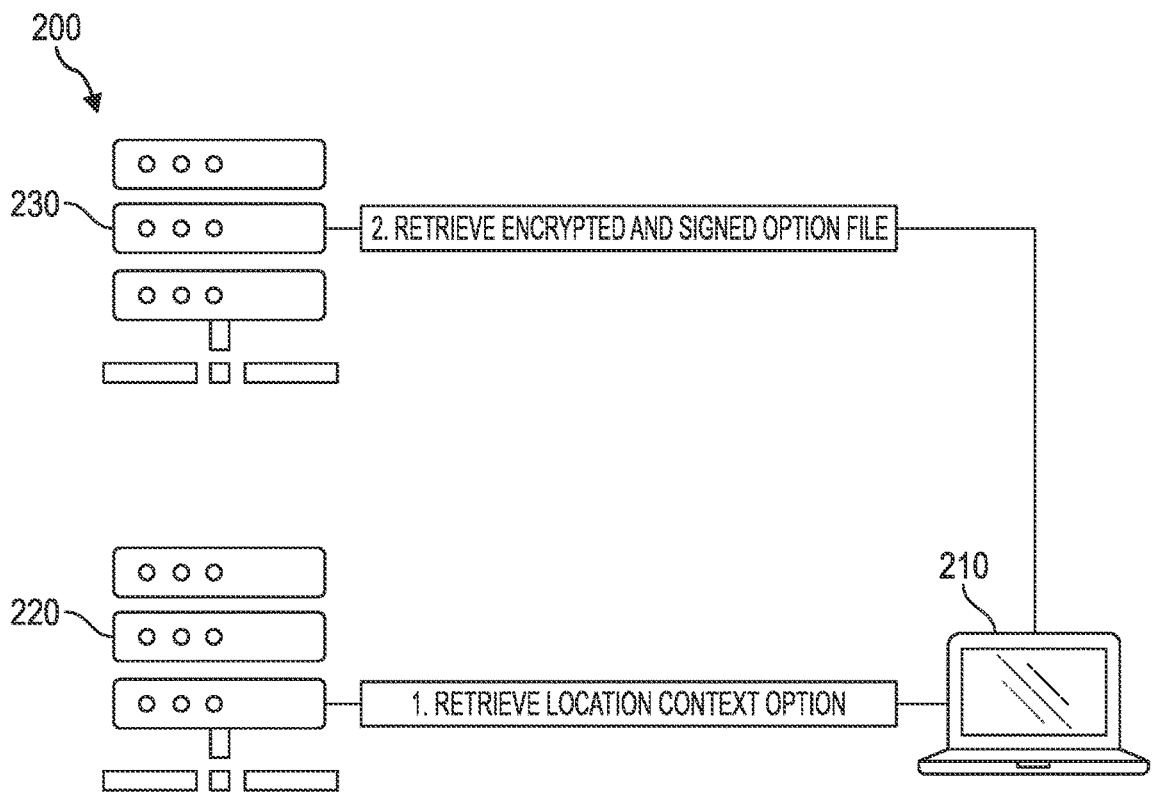
FIG. 2 is a block diagram of an example of endpoint IHS configuration based on network context, according to some embodiments.

In accordance with various embodiments for the present endpoint IHS configuration based on network context, the IHS may use a discovery network service to find a location of an encrypted options document, decrypted and validate the options document using the public encryption key, and use (a) option(s) from the resultingly decrypted options document to modify behavior of the IHS. The IHS may use the discovery network service to determine the IHS's environment, prior to using the discovery network service to find the location of the options document, as described in detail below. In some embodiments, the IHS may remove the public encryption key, in repose to completion of modification of the IHS's behavior in accordance with the option (s) from the decrypted options document FIG. 2 is a block diagram of example 200 of (a portion of) endpoint IHS configuration based on network context, according to some embodiments. In accordance with embodiments of endpoint IHS configuration based on network context IHS 210 will be able to know its current environment in a secure manner by using a discovery network service to find (e.g., from server 220) a location (e.g., server 230) of an option document for the facility, or the like, where IHS 210 is located. The document may, in accordance with various embodiments, be protected by a Secure Sockets Layer (SSL) and/or Transport Layer Security (TLS) connection to a Hypertext Transfer Protocol Secure (https) server (230) and/or may be encrypted and signed, such as through the use of Public Key Infrastructure (PKI) technologies. In accordance with various embodiments, IHS 210 will have been previously loaded with the public key of the facility, such as discussed below with respect to FIGS. 3 and 4. This public key of the facility will enable IHS 210 to decrypt and validate the facility's options document. IHS 210 will then use the options to modify its behavior, such as in a way to optimize the set of tasks to be performed within the facility.

In accordance with various embodiments of the present endpoint IHS configuration based on network context, the specific implementation may be up to the hardware vendor, OS vendor, facility operator, or the like, and could include an ability to remove the public key (certificate) upon completion of configuration. Additionally, or alternatively, in various embodiments of the present endpoint configuration based on network context, the IHS's behavior may only be modified for as long as the IHS can locate the options document, such as while in the environment (e.g., facility, location, area, or the like), such as within wireless range, or in the determined context. Examples of various configuration implementations may include various benefits. For example, single simple user action to toggle all auto power-on features without having to go through System BIOS (SBIOS) setup. A flexibility to enable a user to choose regular IHS operation (normal operation of auto-on flags), or no-auto-power-on IHS operation, where all auto-power-on settings are disabled temporarily. An ability to pick "sticky" or "non-sticky" modes based on hot-key use selection, such that, in "sticky" mode, the toggle will be valid until the next hot-key toggle, and in "non-sticky" mode, the toggle will be valid only until the next IHS power cycle.

Figure 3:
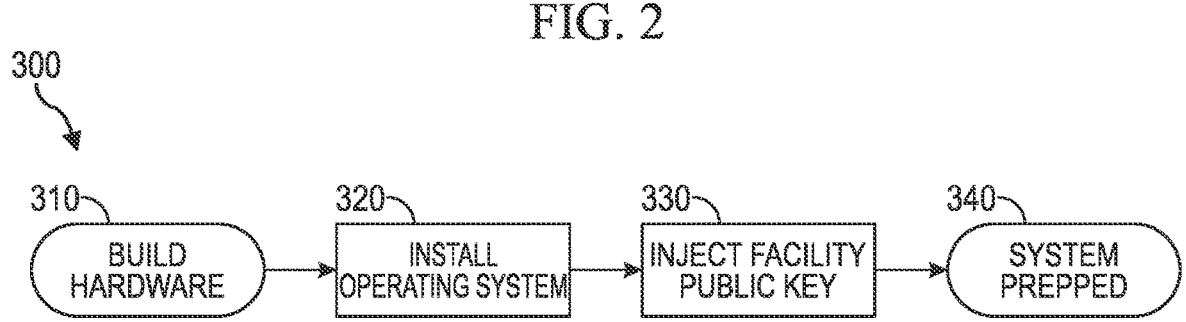
FIG. 3 is a flow diagram of an example of IHS preparation for endpoint configuration based on network context, according to some embodiments.

During the manufacturing process the public key may be placed on the IHS in a place (e.g., stored in a Trusted Platform Module (TPM), etc.) that can be retrieved by the validation process in subsequent boots. FIG. 3 is a flow diagram of example IHS preparation 300 for endpoint configuration based on network context, according to some embodiments. At 310 the hardware (IHS) is built, and at 320, an OS is installed on the IHS. At 330, the facility's public key is injected, such as being placed (e.g., stored) on the IHS in a place from which it can be retrieved for the validation process in subsequent boots of the IHS. This results, at 340, in the IHS being prepped for endpoint configuration based on network context in accordance with various embodiments.

Figure 4:
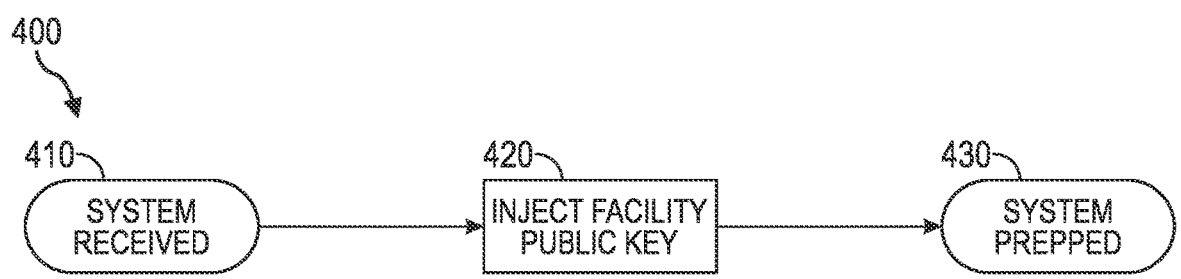
FIG. 4 is a flow diagram of another example of IHS preparation for endpoint configuration based on network context, according to some embodiments.

Alternatively, or additionally, a customer can (also) use the present endpoint IHS configuration based on network context functionality by injecting their public key. FIG. 4 is a flow diagram of other example 400 of IHS preparation for endpoint configuration based on network context, according to some embodiments. At 410 the IHS is received by the customer, and at 420 the facility public key is injected, such as by being placed (e.g., stored) on the IHS in a place from which it can be retrieved for the validation process in subsequent boots of the IHS. This results in the IHS being prepped for endpoint configuration based on network context in accordance with various embodiments at 430.

Figure 5:
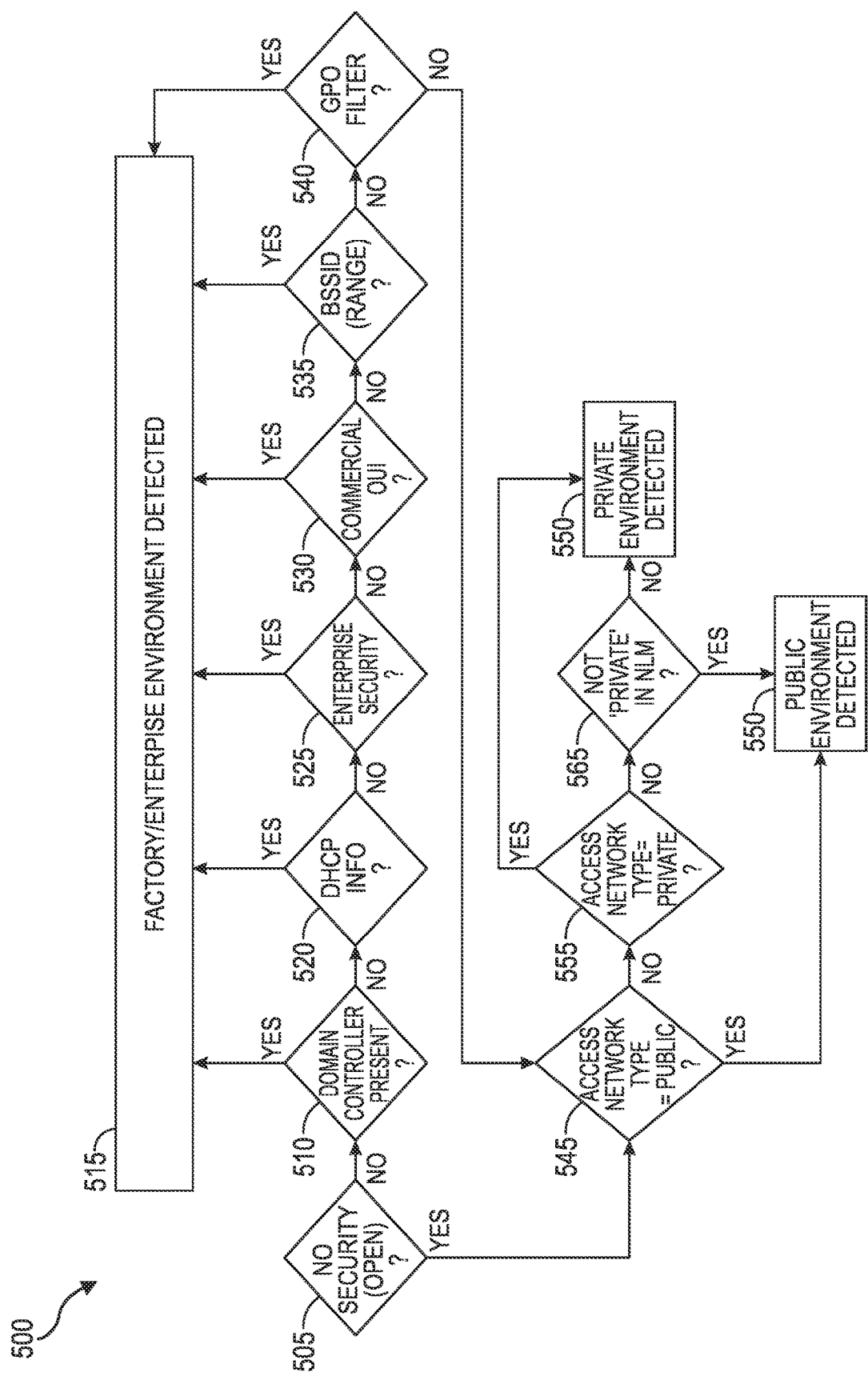
FIG. 5 is a flow diagram of an example of network context detection using a discovery network service, for endpoint IHS configuration, according to some embodiments.

FIG. 5 is a flow diagram of example network context detection 500 using a discovery network service, according to some embodiments. As illustrated in FIG. 5, multiple aspects of wired and/or wireless characteristics can be analyzed by an IHS to determine and authenticate an endpoint environment. One or more criteria may be used, depending on the target application, or the like.

For example, various venues may be enabled with different security methods. For example, an enterprise may employ Wi-Fi® Protected Access 2-Enterprise (WPA2-Enterprise) security, such as Extensible Authentication Protocol Transport Layer Security (EAP-TLS), EAP Tunneled Transport Layer Security (EAP-TTLS), Protected EAP (PEAP), or the like. Whereas a "private" network may employ WPA2-Pre-Shared Key (WPA2-PSK), or the like, while "public" networks may be open, with no security. At 505, an initial determination may be made as to whether a wireless network has security, if not, it is determined at 505 that the network is (potentially) open.

However, if it is determined at 505 that the network has security, the IHS may proceed with detecting whether the network, and thus the IHS, is in a factory and/or enterprise environment. At 510, a determination may be made as to whether a subject enterprise network is managed with a domain controller. If it is determined at 510 that the network is an enterprise network managed with a domain controller this results in a conclusion at 515 that a factory, enterprise, or similar environment has been detected.

On the other hand, if it is determined at 510 that the network is not (or cannot be determined if the network is) managed with a domain controller, Dynamic Host Configuration Protocol (DHCP), or the like, can be used at 520 can used to determine network configuration details such as IP address, subnet mask, gateway information, DNS servers, and/or the like, and whether such information indicates that factory, enterprise, or similar environment 515 has been detected.

Conversely, if it is not determined at 520, using DHCP information, or the like, that a factory, enterprise, or similar environment (515) is detected, a determination may be made at 525 whether the wireless security is WPA2-Enterprise security, such as EAP-TLS, EAP-TTLS, PEAP, or the like. If it is determined at 525 that the wireless network security is WPA2-Enterprise security then it is determined that a factory, enterprise, or similar environment 515 has been detected.

Rather, if it is determined at 525 that the wireless network security is not WPA2-Enterprise security, a determination may be made at 530 as to whether the wireless network has a commercial Organizationally Unique Identifier (OUI), a 24-bit number that uniquely identifies a vendor, manufacturer or other organization, which indicates that a factory, enterprise, or similar environment (515) is detected.

Instead, if it is determined at 530 that the wireless network does not have an OUI, or does not have an OUI that indicates that a factory, enterprise, or similar environment, a Basic Service Set Identifier (BSSID) of the IHS-accessed network AP or Controller Media Access Control (MAC) address (range) may be used, at 535, to detect a specific location, on premises, or a factory floor (515).

Then again, if a specific location, on premises, or a factory floor cannot be detected using the BSSID of the IHS-accessed network AP or Controller MAC address (range) at 535, a determination may be made, at 540, as to whether the network AP or Controller has a Group Policy Object (GPO) filter to authenticate client devices as part of a working environment that is a factory, enterprise, or similar environment (515).

However, if it is determined, at 535 that the IHS is not assigned a Group Policy Object (GPO) to authenticate it as part of a working environment (that is, a factory, enterprise, or similar environment (515)), or if it is initially determined at 505 that the network has no security and is (potentially) open, a further determination is made at 545.

At 545, a determination is made as to whether the network is a public-type network. This determination may be made by the IHS examining the information element in the header of (each) network packet(s). Access Network Options (ANO) in IEEE 802.11 specifies that an IE is to define an Access Network Type (ANT). If it is determined at 545 that the ANT is "public", a public environment is considered detected at 550. However, if it is determined at 545 that the ANT is not "public," a determination is made, at 555 as to whether the ANT is "private." If it is determined at 555 that the ANT is "private," a private environment is considered detected at 560. However, if it is determined at 555 that the ANT is not "private," either (i.e., it is determined at 545 that the ANT is not "public" and at 555 that the ANT is not "private"), a determination is made, at 565 as to whether the network is not listed in a Network List Manager (NLM), or the like, as "private." Application Programing Interfaces (APIs) such WINDOWS NLM enables applications to retrieve a list of available network connections, and the determination at 555 may Leverage WINDOWS categorization of network type, which allows for a user to configure a network as "public" or "private." If it is determined at 565 that the network is not configured as "private" in the NLM, then a public environment is considered detected at 550. However, if it is determined at 565 that the network is configured as "private" in the NLM, then a private environment is considered detected at 560.

Figure 6:
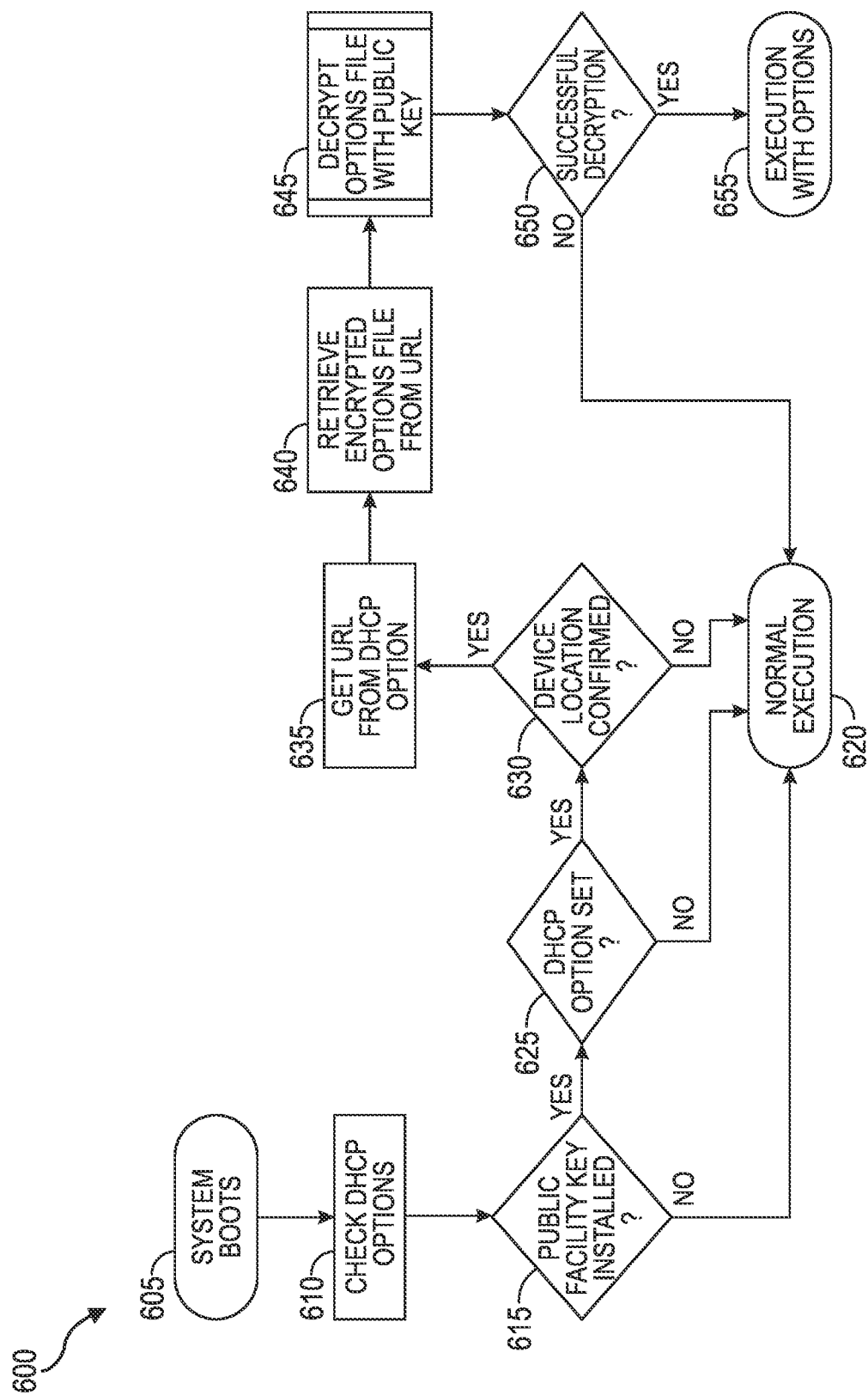
FIG. 6 is a flowchart of an example of endpoint IHS configuration based on network context, according to some embodiments.

FIG. 6 is a flowchart of example endpoint IHS configuration 600 based on network context, according to some embodiments. Therein, at 605, the IHS (100, 210) boots, and at 610, uses a discovery network service (500), such as described above, with respect to FIG. 5, to find a location of a DHCP options document for the facility, location, or the like. Then (or concurrent therewith), the IHS checks, at 615, to determine if there are public keys injected (i.e., installed on the IHS) for use in endpoint IHS configuration based on network context. If not, the IHS will continue with its normal behavior (i.e., normal execution) at 620. However, if it is determined at 615 that an endpoint IHS configuration based on network context key is present on the IHS, the IHS will check, at 625, for a DHCP option to be set with a secure protocol URL (e.g., an https URL). As discussed, typically, the DHCP options methodology is not secure, and each option is limited in the amount of data it can hold. By employing an HTTPS server, in accordance with embodiments of the present endpoint IHS configuration based on network context, the IHS can assure that it is getting the correct encrypted options file, which may include options beyond those enumerated under DHCP, holding more data than under DHCP limits, and/or the like. The use of a PKI public key, in accordance with embodiments of the present endpoint IHS configuration based on network context, provides, in effect, a second authentication method to increase security, as further detailed below.

If it is determined at 625 that a DHCP option is not set, the IHS will continue with normal operations at 620. However, if it is determined at 625 that a DHCP option is set in the IHS, the IHS will, confirm the IHS's location, at 630, such as through operation of the discovery network service (500, at 520), such as described above, with respect to FIG. 5. If the IHS cannot confirm the IHS's location at 630, the IHS will continue with normal operations at 620. However, if the IHS confirms the IHS's location at 630, the IHS retrieves an URL for the secure protocol server (e.g., an https URL) from the DHCP option, at 635 and at 640 use the URL to retrieve the encrypted endpoint IHS configuration document for the facility, location, or the like, from a server (230), or the like. Under embodiments of the present endpoint IHS configuration based on network context, use of HTTPS will prevent spoofing of a webservice origin, or the like, through which the options document may be provided.

In accordance with embodiments of the present endpoint IHS configuration based on network context, the encrypted document can only be validated and decrypted, at 645, by an IHS that contains the public key, which may in accordance with various embodiments may be a public key of asymmetric PKI keysets. If it is determined at 650 that the decryption failed, then the IHS can continue with its normal execution, at 620. However, if the decryption deemed successful at 650, the document can be used by the IHS to modify its behavior according thereto, such as through execution with the options in the options document, in the manner described above.

Also, as noted, embodiments of the present endpoint configuration based on network context may include an ability to remove the public key (certificate) upon completion of configuration. As also noted, the IHS's behavior may only be modified in some embodiments for as long as the IHS can locate the options document, such as while in the environment (e.g., facility, location, area, or the like), such as within wireless range, or in the determined context.

In accordance with the foregoing, embodiments of the present endpoint configuration based on network context enables contextual configurability of an endpoint device using location and/or network dependent secure methods to enable contextual tasks. Embodiments of the present endpoint configuration based on network context employ an easily discoverable secure network protocol to provide context for the location and/or network, while enhancing security, in that the endpoint device or node is locked with secure network protocols (e.g., using DHCP plus PKI for secure context based endpoint configuration). Embodiments of the present endpoint configuration based on network context may reduce test and/or debug time (e.g., by avoiding complex key press sequencer, training and/or the like), thereby making such operations more simple, fast, less error prone, and/or the like, by, in accordance with the foregoing described embodiments, indicating to the IHS to change configuration to match contextual requirements. For example, embodiments of the present endpoint configuration based on network context may enabled faster testing, such as by enabling validation scenarios to be automatically configured (debug, manufacturing, accessory modes, and/or the like), by avoiding need for register lock/unlock needs for test and/or service modes. In various embodiments, the present endpoint IHS configuration based on network context allows for contextual provisioning that may be shared by an OEM, or the like, with trusted partners to enable specific configurations in order to enable first touch, second touch, third touch, etc. provisioning of the IHS.

Embodiments of the present endpoint configuration based on network context addresses various challenges in IHS manufacturing, configuration, and/or the like, and decreases human interaction and/or error therein. For example, present embodiments enable an IHS to determine that it is in a manufacturing (OEM) facility, and configure itself accordingly, eliminating need for human interaction, thereby lowering cost per unit (IHS) due to reduction in labor, as well as re-work due to human error, or the like. The present functionality for endpoint configuration based on network context is usable in various facilities and/or environments to provide configuration information to the endpoint that may not be needed outside of the facility (e.g., proxy, cache, servers, etc.). Also, this functionality has very wide applicability as it enables an OEM, or the like, and its customers to create specific behaviors and modalities for their devices regardless of who is logged in or how the endpoint is utilized.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

Reference may be made herein to "configuring" a device or a device "configured for" or "configured to" perform some operation(s), or the like. It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS) comprising:
a public encryption key;
a processor; and
a memory coupled to the processor, the memory having program instructions stored thereon that, upon execution by the processor, cause the IHS to:
use a discovery network service to determine the IHS's environment by:
determining a wireless network accessed by the IHS is open by determining the network does not have security;
determining the IHS's environment is a factory and/or enterprise environment;
determining the IHS's environment is public; and
determining the IHS's environment is private;
use the discovery network service to find a location of an encrypted options document;
decrypt and validate the options document using the public encryption key; and
use one or more options from the resultingly decrypted options document to modify behavior of the IHS.

2. The IHS of claim 1,
wherein the determining that the IHS's environment is the factory and/or enterprise environment comprises:
determining the network is managed by a domain controller;
using a network management protocol to determine network configuration details;
determining the network has WI-FI Protected Access 2-Enterprise (WPA2-Enterprise) security;
determining the network has a commercial Organizationally Unique Identifier (OUI); and
using a Basic Service Set Identifier (BSSID) of an access point of the network and/or a Controller Media Access Control (MAC) address range to detect a specific location; or
determining the network AP or controller has a Group Policy Object (GPO) filter to authenticate client devices as part of a working environment;
wherein the determining that the IHS's environment is public comprises:
determining an information element in a header of one or more network packets defines an Access Network Options (ANO) Access Network Type (ANT) as public; or
determining the network is not listed in a Network List Manager (NLM) as private; and
wherein the determining that the IHS's environment is private comprises:
determining the information element in the header of the one or more network packets defines the ANO ANT as private; or
determining the network is listed in the NLM as private.

3. The IHS of claim 1, wherein the options document is encrypted and signed using public key infrastructure.

4. The IHS of claim 1, wherein the location of the options document is a secure protocol uniform resource locator, and wherein, upon execution by the processor, the program instructions further cause the IHS to retrieve the encrypted options document at the secure protocol uniform resource locator via a transport layer security connection to the secure protocol uniform resource locator.

5. The IHS of claim 1, wherein the location of the options document is a secure protocol server IHS, and wherein, upon execution by the processor, the program instructions further cause the IHS to retrieve the encrypted options document from the secure protocol server IHS via a transport layer security connection to the secure protocol server IHS.

6. The IHS of claim 1, wherein the public encryption key and the options document are associated with a facility.

7. The IHS of claim 6, wherein the one or more options from the decrypted options document modify behavior of the IHS to optimize one or more tasks to be performed within the facility.

8. The IHS of claim 1, wherein, upon execution by the processor, the program instructions further cause the IHS to remove the public encryption key, in response to completion of modification of the IHS's behavior in accordance with the one or more options from the decrypted options document.

9. The IHS of claim 1 wherein the IHS's behavior is modified for as long as the IHS can locate the options document.

10. A method comprising:
  determining, by an Information Handling System (IHS), whether a public encryption key for use in endpoint configuration based on network context is installed on the IHS;
  using a discovery network service to determine the IHS's environment by:
    determining a wireless network accessed by the IHS is open by determining the network does not have security;
    determining the IHS's environment is a factory and/or enterprise environment;
    determining the IHS's environment is public; and
    determining the IHS's environment is private;
  using the discovery network service, by the IHS, to find a location of an encrypted options document;
  decrypting and validating the options document, by the IHS, using the public encryption key; and
  modifying behavior of the IHS, by the IHS, using one or more options from the resultingly decrypted options document.

11. The method of claim 10,
  wherein the determining that the IHS's environment is a factory and/or enterprise environment comprises:
    determining the network is managed by a domain controller;
    using a network management protocol to determine network configuration details;
    determining the network has WI-FI Protected Access 2-Enterprise (WPA2-Enterprise) security;
    determining the network has a commercial Organizationally Unique Identifier (OUI); and
    using a Basic Service Set Identifier (BSSID) of an access point of the network and/or a Controller Media Access Control (MAC) address range to detect a specific location; or
    determining the network AP or controller has a Group Policy Object (GPO) filter to authenticate client devices as part of a working environment;
  wherein the determining that the IHS's environment is public comprises:
    determining an information element in a header of one or more network packets defines an Access Network Options (ANO) Access Network Type (ANT) as public; or
    determining the network is not listed in a Network List Manager (NLM) as private; and
  wherein the determining that the IHS's environment is private comprises:
    determining the information element in the header of the one or more network packets defines the ANO ANT as private; or
    determining the network is listed in the NLM as private.

12. The method of claim 10, wherein the location of the options document is a secure protocol uniform resource locator, and the method further comprises retrieving, by the IHS, the options document at the secure protocol uniform resource locator via a transport layer security connection to the secure protocol uniform resource locator.

13. The method of claim 10, wherein the location of the options document is a secure protocol server IHS, and the method further comprises retrieving, by the IHS, the encrypted options document from the secure protocol server IHS via a transport layer security connection to the secure protocol server IHS.

14. The method of claim 10, wherein the public encryption key and the options document are associated with a facility and the method further comprises one or more options from the decrypted options document modifying behavior of the IHS to optimize one or more tasks to be performed within the facility.

15. The method of claim 10, further comprising removing the public encryption key, in response to completion of modifying the behavior of the IHS using the one or more options from the decrypted options document.

16. The method of claim 10 wherein the IHS's behavior is modified for as long as the IHS can locate the options document.

17. A non-transitory computer readable medium having program instructions stored thereon that, upon execution by an Information Handling System (IHS), cause the IHS to:
  determine whether a public encryption key for use in endpoint configuration based on network context is installed on the IHS and in response to a determination that the public encryption key for use in endpoint configuration based on network context is installed on the IHS:
  use a discovery network service to determine the IHS's environment by:
    determining a wireless network accessed by the IHS is open by determining the network does not have security;
    determining the IHS's environment is a factory and/or enterprise environment;
    determining the IHS's environment is public; and
    determining the IHS's environment is private;
  use the discovery network service to find a location of an encrypted options document;
  decrypt and validate the options document using the public encryption key; and
  use one or more options from the resultingly decrypted options document to modify behavior of the IHS.

18. The non-transitory computer readable medium of claim 17,
  wherein the determining that the IHS's environment is the factory and/or enterprise environment comprises:
    determining the network is managed by a domain controller;
    using a network management protocol to determine network configuration details;
    determining the network has WI-FI Protected Access 2-Enterprise (WPA2-Enterprise) security;
    determining the network has a commercial Organizationally Unique Identifier (OUI); and
    using a Basic Service Set Identifier (BSSID) of an access point of the network and/or a Controller Media Access Control (MAC) address range to detect a specific location; or
    determining the network AP or controller has a Group Policy Object (GPO) filter to authenticate client devices as part of a working environment;
  wherein the determining that the IHS's environment is public comprises:
    determining an information element in a header of one or more network packets defines an Access Network Options (ANO) Access Network Type (ANT) as public; or
    determining the network is not listed in a Network List Manager (NLM) as private; and
  wherein the determining that the IHS's environment is private comprises:

determining the information element in the header of the one or more network packets defines the ANO ANT as private; or determining the network is listed in the NLM as private.

\* \* \* \* \*